Sept. 21, 1954

A. S. BEAM ET AL 2,689,410

BEVEL GEAR CHECKING MASTER

Filed June 3, 1946

INVENTORS
ALBERT S. BEAM
and CLARENCE B. STAPLETON
BY
Pennie, Edmonds, Morton & Barrows
ATTORNEYS Sept. 21, 1954    A. S. BEAM ET AL    2,689,410
BEVEL GEAR CHECKING MASTER
Filed June 3, 1946    2 Sheets-Sheet 2
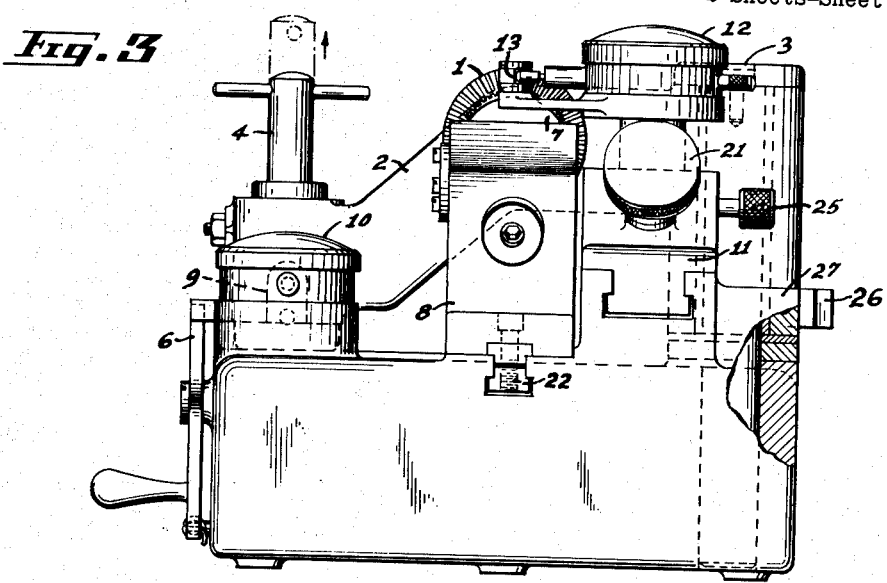
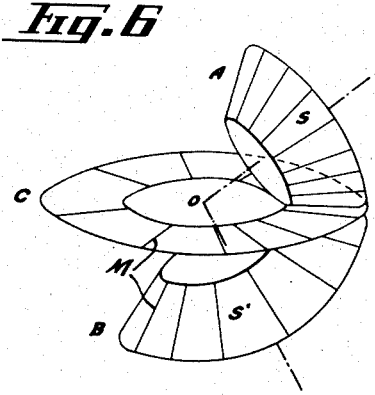
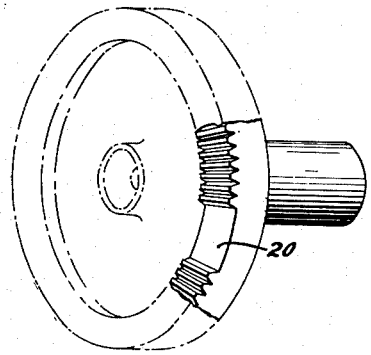
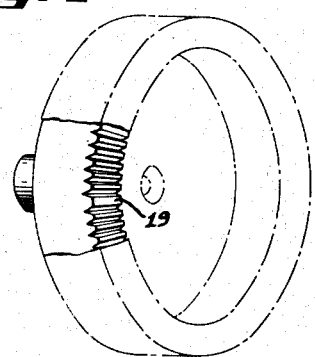
INVENTORS
ALBERT S. BEAM
and CLARENCE B. STAPLETON
BY
Pennie, Edmonds, Morton & Barrows
ATTORNEYS Patented Sept. 21, 1954

2,689,410

UNITED STATES PATENT OFFICE 2,689,410

BEVEL GEAR CHECKING MASTER

Albert S. Beam and Clarence B. Stapleton, Detroit, Mich., assignors to Vinco Corporation, Detroit, Mich., a corporation of Michigan Application June 3, 1946, Serial No. 674,152

1 Claim. (Cl. 33—179.5)

This invention relates to gear checking and especially to the checking of concentricity and location of pitch cone, runout, backlash and tooth contact or bearing conditions of bevel gears against a bevel gear checking master. The runout test covers the composite effect of errors in any gear element, including tooth profile, spacing, concentricity of pitch diameter, helix angle and tooth spirals.

While the use of bevel gears is very common, no satisfactory equipment was formerly available for accurate and conclusive inspection. Hence, the production of bevel gears is usually followed by a mating process in which a particular set of bevel gears is selected to run well together. This sometimes requires a run in period, or even lapping or burnishing in order to get the desired results and, in any event, complicates production, assembly and replacement.

It is the principal object of our invention to overcome this difficulty and to permit the production of bevel gears within specified tolerances so they can be used in interchangeable assembly by means of improved inspection procedure made possible by the use of our invention.

When a bevel gear checking master is constructed according to our invention, it is not, as in the case of a spur gear checking master, an extremely precise rendering of the gear to be mated to the gear being checked. It is instead a conjugate crown gear corresponding to the basic spherical rack of the production bevel gear being checked. The teeth of this master crown gear may be straight or curved, depending on whether the bevel gear being checked is of the straight, spiral, zerol or hypoid type.

The theory of bevel gears has been well known for many years. We have constructed a bevel gear checking master which represents the theoretical spherical rack or crown gear used as the basis of generating the bevel gear in question; thus, previous difficulties in producing accurate master bevel gears are avoided since the tooth surfaces of a crown gear represent simple geometric elements, such as planes or cones and, therefore, can be accurately produced and readily inspected.

In the case of straight bevel gears, the straight sided tooth of the bevel gear checking master can be produced as easily as the similar straight sided tooth of a straight rack.

It is to be observed that the bevel gear checking master, though in the form of a crown gear, cannot be accurately termed a crown gear because the ratio of its pitch circumference to its circular pitch is not necessarily an intergal number. In the theoretical spherical rack of mating bevel gears, the pitch radius of the rack is established by the shaft angle and the pitch radii of the mating gears. Hence, the pitch circumference of the theoretical crown gear does not necessarily comprise an integral number of circular pitches.

The use of a bevel gear checking master in the form of a crown gear allows an arrangement of the checking fixture in which the direction of force exerted on the crown gear by irregularities in the bevel gear is axial and not, as it would be with a master in true bevel gear form, oblique, thus achieving much greater sensitivity in the inspection fixture.

For a better understanding of our invention, reference is made to the accompanying drawings, in which:

Fig. 3 is a side elevation of the fixture shown in Fig. 1;

Figs. 4 and 5 are perspective views of a bevel gear checking master constructed according to our invention; and Fig. 6 is a diagram illustrating the imaginary common pitch plane of a pair of bevel gears.

Figure 1:
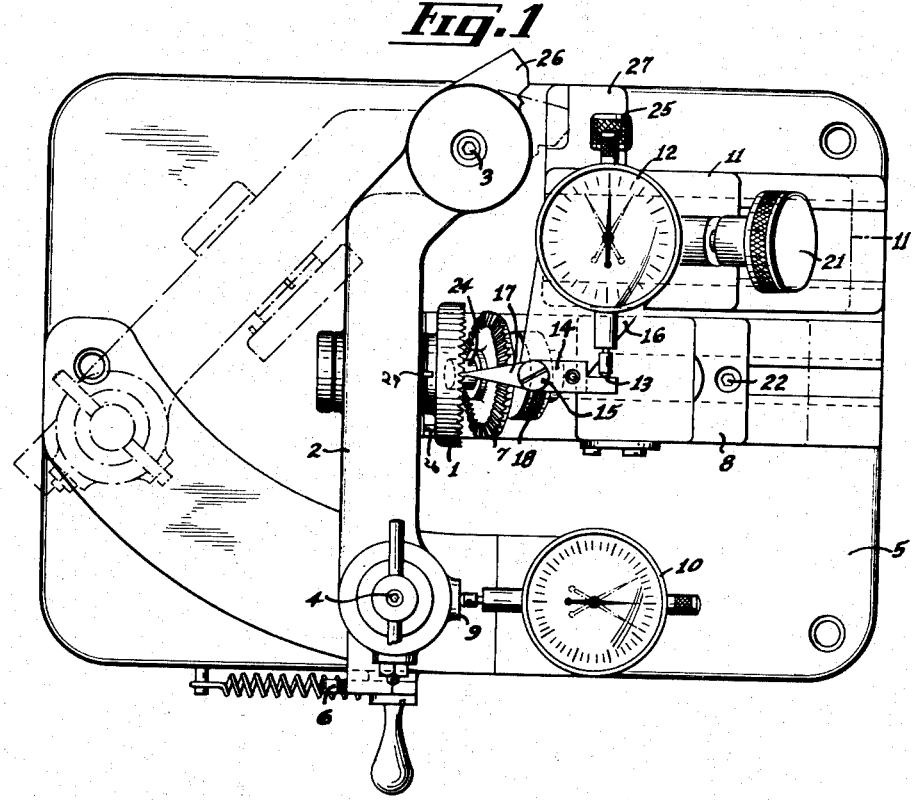
Fig. 1 is a top plan view of a bevel gear checking fixture constructed according to our invention.
Figure 2:
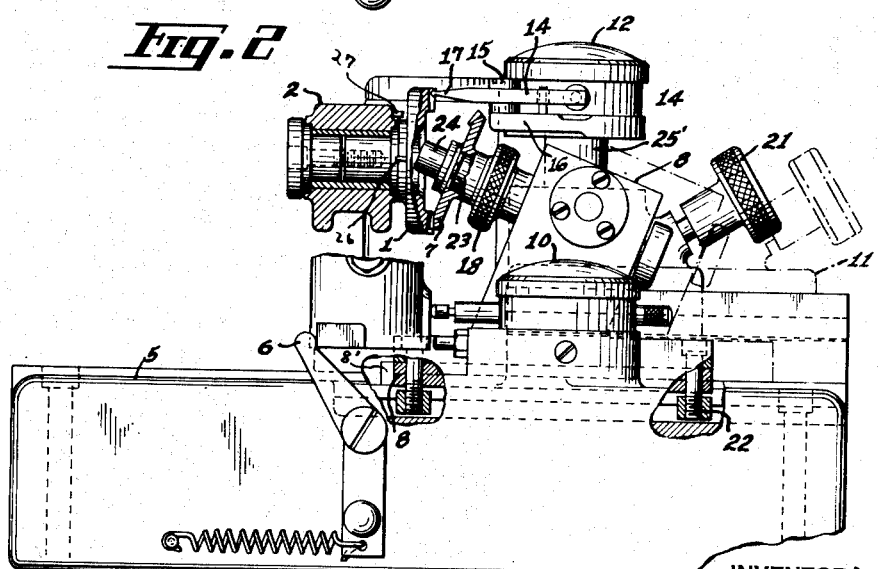
Fig. 2 is a front elevation of the fixture shown in Fig. 1.

In Figs. 1, 2 and 3, we have illustrated a preferred embodiment of a fixture employing our bevel gear checking master. This embodiment enables the advantages of our checking master to be realized fully, but for special purposes other fixtures have been found suitable. In it, the checking master 1 is rotatably mounted on an offset swinging arm 2. The arm 2 is pivoted about the axis 3 at one end and has a locking device 4 at the other end with which it may be precisely located upon the base 5.

The axis of rotation of the checking master 1 is located between axis 3 and locking device 4, and is perpendicular to axis 3. The pitch plane of the bevel gear checking master 1 will normally fall at or near axis 3 by reason of the offset. A boss 9 is located on the arm 2 with a machined face lying in a plane containing axis 3. An indicator 10 is mounted on base 5 in contact with boss 9 to indicate minute movements of arm 2 about axis 3. At the extreme free end of the arm 2, the spring actuated lever 6 urges it to rotate about its pivot axis 3 in the direction to press the teeth of the checking master 1 into mesh with the teeth of the production bevel gear 7 being checked.

This gear 7 is mounted on the slide 8 so as to be capable of rotation about its axis when the fixture is employed to check the concentricity of pitch cone and runout. Slide 8 is so constructed that the axis of gear 7 intersects the axis of the checking master 1 when arm 2 is fixed by lock 4. The position of the slide 8 on base 5 is set by moving slide 8 in contact with stop block 8', so that the pitch cone vertex of gear 7 coincides with the vertex of checking master 1 when arm 2 is fixed by lock 4. Slide 8 is then locked to base 5 in this position by locking device 22. The swinging arm 2 is then allowed to swing freely by releasing locking device 4 so that the face of checking master 1 is pressed forward and its teeth engage the teeth of bevel gear 7 under the influence of the spring pressed lever 6. Using hand wheel 18 the bevel gear 7 is rotated by hand, carrying with it the checking master 1. The indicator 10 will register, as a plus or minus reading in fractions of an inch, the exact amount of any eccentricity of the pitch cone or run-out of the bevel gear.

It will be observed that a greater degree of sensitivity is obtained by having the indicator 10 in engagement with boss 9 further from pivot axis 3 than the mating teeth of checking master 1 and bevel gear 7. However, since the movement of boss 9 will be directly proportional to the runout of gear 7, the indicator 10 can be calibrated to read directly the actual amount of run-out.

The fixture also carries on base 5 the additional slide 11, bearing the indicator 12 arranged to read the movement of a point on the heel 13 of arm 14 about pivot 15. The arm 14 is carried by pivot 15 on the bracket 16 of slide 17l. The toe 17 of arm 14 terminates in a ball point which engages with the teeth of checking master 1. The arm 14 can be brought, by adjusting slide 11, to have the ball point of the toe 17 lie between and in contact with the teeth of checking master 1.

In order to check the backlash of the production bevel gear 7, arm 2 is locked in position by the locking device 4. The position in which locking device 4 holds the arm 2 is such that the pitch plane of the checking master 1 is tangent to the pitch cone of gear 7. The slide 11 is adjusted as previously described, and locked with the hand wheel 21. The bevel gear 7 is now locked by means of a knob not shown so that it cannot rotate about its axis. Rocking of checking master 1 about its axis by hand will now indicate on the indicator 12 the amount of backlash between checking master 1 and bevel gear 7. The movement of heel 13 about pivot 15 is directly proportional to the movement of the ball point of the toe 17, so that indicator 12 can be calibrated to read the backlash directly. Since the tooth thickness of the master at the pitch line is accurate and known, the backlash reading can be readily evaluated.

The fixture illustrated in Figs. 1, 2 and 3 is arranged for efficient checking of production bevel gears of sizes varying within its capacity. As shown in the dash-dotted lines in Fig. 1, the swinging arm 2 turns away from the spindle 23 carrying gear 7, permitting easy removal of cap 24 for subsequent reloading. Its swing is limited by cooperation of stops 26 and 27. As shown in the dash-dotted lines in Fig. 2, the slide 11 carrying the backlash measuring apparatus is retractable during the runout measuring operation, the hand-wheel 21 serving to lock slide 11 conveniently as desired.

Bracket 16 which carries indicator 12 and arm 14 may be raised or lowered by loosening screw 25 and adjusting post 25' vertically in slide 11, so as to accommodate any size checking master within the range of the fixture.

The setting of slide 8 is accomplished by moving it in firm contact with stop block 8' and remains undisturbed for the entire run of inspection of a particular production gear. Periodic setting checks may be made by checking the position of the center of master 1 with respect to the axis of spindle 23 and parts locating surface on hand wheel 18. This setting is done with arm 2 fixedly by locking device 4. Slide 8, complete, must be specially constructed for each model gear being checked to provide proper angle, location and size for spindle 23. Special checking masters 1 must likewise be specially constructed for each mating set of production gears being inspected. One fixture may be used for various part gears to be checked by merely changing master 1 and slide 8.

In Figs. 4 and 5 are illustrated two bevel gear checking masters constructed for straight bevel gears according to our invention. Since these checking masters are not in fact crown gears, it is only accidental if the circumference of the crown gear divided by the circular pitch yields an integral number. The result can plainly be seen in Fig. 4 as the wide tooth 19. A checking master made as shown in Fig. 4 cannot obviously be rotated through 360° in mesh with a bevel gear without interference by the wide tooth 19. The form of checking master shown in Fig. 5 is to be preferred in which the thick tooth and as many of the regular teeth as necessary to prevent interference are removed, leaving the open space 20 along the root surface of the crown gear. The dimension of the open space 20 depends principally upon the pitch cone angle of the production gear to be checked and more relief is required as the pitch cone angle increases because a larger pitch cone angle results in a larger pitch diameter of the part and, consequently, more tooth engagement. The use of a space 20 rather than a thick tooth 19 permits the utilization of all teeth on the bevel gear checking master 1.

The number of teeth thus provided on the master 1 usually exceeds the number of teeth of the part 7 thus permitting a full rotation of the part 7 to be checked. However, for parts with very large pitch cone angles, it may be necessary to check the circumference of the part in two operations by altering the relative position of the part with the checking master. To prevent the part from running over the wide space, stop pins 26 and 27 are provided in the mounting of the master gear.

In Fig. 6, we illustrate the imaginary common pitch plane C of a pair of ideal bevel gears A and B, the common apex of whose pitch cones is at O. Clearly the contacting portion of the pitch plane C is an annular disc centered about O and it is this annular disc which constitutes the pitch plane of the checking master.

As shown in Fig. 6, the teeth S and S' of the bevel gears A and B are straight and lines M will be radial to the center O. In case of spiral, bevel, zerol or hypoid gears, the lines M representing teeth to be cut in a checking master will be arcs of a circle. Any other shape that could be generated mechanically may be incorporated into a checking master.

The great value of this invention derives from the ease and precision with which a bevel gear checking master constructed according to our invention can be machined and inspected in contrast to the extreme difficulty of machining and inspecting an actual bevel gear with sufficient precision to use it as a master in a gear rolling fixture.

While we have described our invention in detail in relation to a preferred embodiment of it in the particular fixture illustrated, we do not wish to be limited to the details of that construction. For example, a workable fixture can be made carrying the gear to be checked on the swinging arm and the checking master on the slide. Or, the test for backlash may be performed equally well with the pointer resting on a tooth of the gear to be checked and the checking master locked against rotation. Hence, for a clear statement of the scope of the invention, reference is made to the appended claim.

We claim:

A bevel gear checking master in the form of a toothed crown wheel corresponding to the basic spherical rack of a bevel gear to be checked having enough contiguous teeth relieved to provide space sufficient to permit free rotation of said bevel gear without interference from said crown wheel when the pitch plane of said crown wheel is tangent to the pitch cone of said bevel gear and apex of said cone lies on the axis of said crown wheel.

References Cited in the file of this patent

UNITED STATES PATENTS

| Number | Name | Date |
| --- | --- | --- |
| 755,595 | Graham | Mar. 22, 1904 |
| 1,136,069 | Weaver | Apr. 20, 1915 |
| 1,233,014 | Baker | July 10, 1917 |
| 1,363,799 | Logue | Dec. 28, 1920 |
| 1,554,646 | Olson | Sept. 22, 1925 |
| 1,624,415 | Logue | Apr. 12, 1927 |
| 1,663,084 | Logue | Mar. 20, 1928 |
| 2,394,623 | Martin | Feb. 12, 1946 |
| 2,447,445 | Widen et al. | Aug. 17, 1948 |
| 2,540,961 | Osplack | Feb. 6, 1951 |

OTHER REFERENCES

Hamilton: "Gages, Gaging and Inspection," The Industrial Press, N. Y., 1918, page 266.

"Machinery," July 1925, page 888.

Jones, F. D.: "Engineering Encyclopedia," volume 1, 1941, The Industrial Press, New York, pages 129 and 130.